US011947292B2

(12) United States Patent
Ueno et al.

(10) Patent No.: US 11,947,292 B2
(45) Date of Patent: Apr. 2, 2024

(54) HEATER AND IMAGE FORMING DEVICE

(71) Applicant: Toshiba Lighting & Technology Corporation, Kanagawa (JP)

(72) Inventors: Kousuke Ueno, Ehime (JP); Masahiko Tamai, Ehime (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 0 days.

(21) Appl. No.: 17/886,467

(22) Filed: Aug. 12, 2022

(65) Prior Publication Data

US 2023/0185221 A1 Jun. 15, 2023

(30) Foreign Application Priority Data

Dec. 9, 2021 (JP) ................................ 2021-200267

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| | | | | |
|---|---|---|---|---|
| 2016/0238974 | A1 | 8/2016 | Kadowaki | |
| 2020/0033771 | A1* | 1/2020 | Furuichi | G03G 15/80 |
| 2022/0066357 | A1* | 3/2022 | Kikuchi | G03G 15/2053 |

FOREIGN PATENT DOCUMENTS

| | | |
|---|---|---|
| EP | 2975466 | 1/2016 |
| JP | 2003337484 | 11/2003 |
| JP | 2009244867 | 10/2009 |
| JP | 2013073206 | 4/2013 |
| JP | 2020149832 | 9/2020 |

* cited by examiner

*Primary Examiner* — Thomas S Giampaolo, II
(74) *Attorney, Agent, or Firm* — JCIPRNET

(57) ABSTRACT

A heater includes: a substrate including metal and having a shape extending in one direction; a first insulating part provided on a first surface of the substrate; a first heating element provided on the first insulating part and extending along a longitudinal direction of the substrate; a first protection part provided on the first insulating part and covering the first heating element; a second insulating part provided on a second surface of the substrate facing the first surface; a second heating element provided on the second insulating part and extending along the longitudinal direction of the substrate; and a second protection part provided on the second insulating part and covering the second heating element. A length of the second heating element is different from a length of the first heating element in the longitudinal direction of the substrate.

4 Claims, 4 Drawing Sheets

HEATER AND IMAGE FORMING DEVICE

CROSS-REFERENCE TO RELATED APPLICATION

This application claims the priority benefit of Japan application serial no. 2021-200267, filed on Dec. 9, 2021. The entirety of the above-mentioned patent application is hereby incorporated by reference herein and made a part of this specification.

BACKGROUND

Technical Field

Embodiments of the disclosure relate to a heater and an image forming device.

Description of Related Art

An image forming device such as a copying machine or a printer is provided with a heater for fixing toner. Further, a heater is also provided in a print erasing device or the like provided in a rewritable card reader/writer or the like. Generally, such a heater has a long substrate, a heating element provided on one surface of the substrate and extending in the longitudinal direction of the substrate, and a protection part for covering the heating element.

In recent years, it has been required to heat objects of different sizes with one heater, that is, to be versatile with respect to the size of the objects to be heated. Therefore, a heater has been proposed in which multiple heating elements are provided on one surface of a long substrate and the heating range is switched according to the size of the object to be heated.

However, in such a heater, multiple heating elements are provided side by side in the lateral direction (width direction) of the long substrate. Therefore, it is difficult to reduce the size of the heater because the dimension of the substrate in the lateral direction becomes large.

Further, in such a heater, a substrate made of ceramics is used. Therefore, when the heating range is switched according to the size of the object to be heated, the temperature difference in the longitudinal direction of the long substrate may become large, and the substrate may be cracked due to the generated thermal stress.

Therefore, it has been desired to develop a technique capable of switching the heating range according to the size of the object to be heated and reducing the size and suppressing the damage of the substrate.

RELATED ART

Patent Literature

[Patent Literature 1] Japanese Patent Application Laid-Open No. 2009-244867

SUMMARY

Technical Problem

The disclosure provides a heater and an image forming device capable of switching the heating range according to the size of the object to be heated, and capable of reducing the size and suppressing damage to the substrate.

Solution to Problem

A heater according to an embodiment includes: a substrate including metal and having a shape extending in one direction; a first insulating part provided on a first surface of the substrate and having an insulating property; a first heating element provided on the first insulating part and extending along a longitudinal direction of the substrate; a first protection part provided on the first insulating part, extending along the longitudinal direction of the substrate and covering the first heating element; a second insulating part provided on a second surface of the substrate facing the first surface and having an insulating property; a second heating element provided on the second insulating part and extending along the longitudinal direction of the substrate; and a second protection part provided on the second insulating part, extending along the longitudinal direction of the substrate and covering the second heating element. A length of the second heating element is different from a length of the first heating element in the longitudinal direction of the substrate.

Effects

According to an embodiment of the disclosure, it is possible to provide a heater and an image forming device capable of switching the heating range according to the size of the object to be heated, and capable of reducing the size and suppressing damage to the substrate.

DESCRIPTION OF EMBODIMENTS

Figure 1:
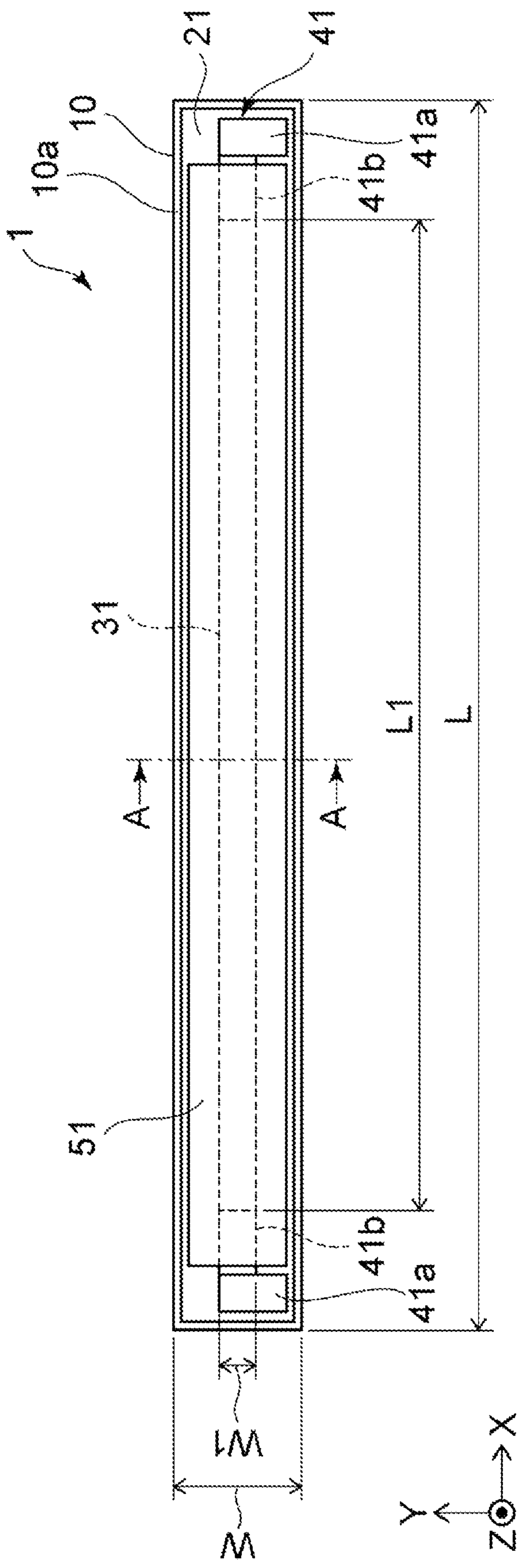
FIG. 1 is a schematic view of a heater according to the embodiment as viewed from one side in the Z direction.

Hereinafter, embodiments will be described with reference to the drawings. In each drawing, similar components are designated by the same reference numerals, and detailed description thereof will be omitted as appropriate. Further, the arrows X, Y, and Z in each drawing represent three directions orthogonal to each other. For example, the longitudinal direction of the substrate is the X direction; the lateral direction (width direction) of the substrate is the Y direction; and the direction perpendicular to the surface of the substrate is the Z direction.

(Heater)

FIG. 1 is a schematic view of a heater 1 according to this embodiment as viewed from one side in the Z direction.

Figure 2:
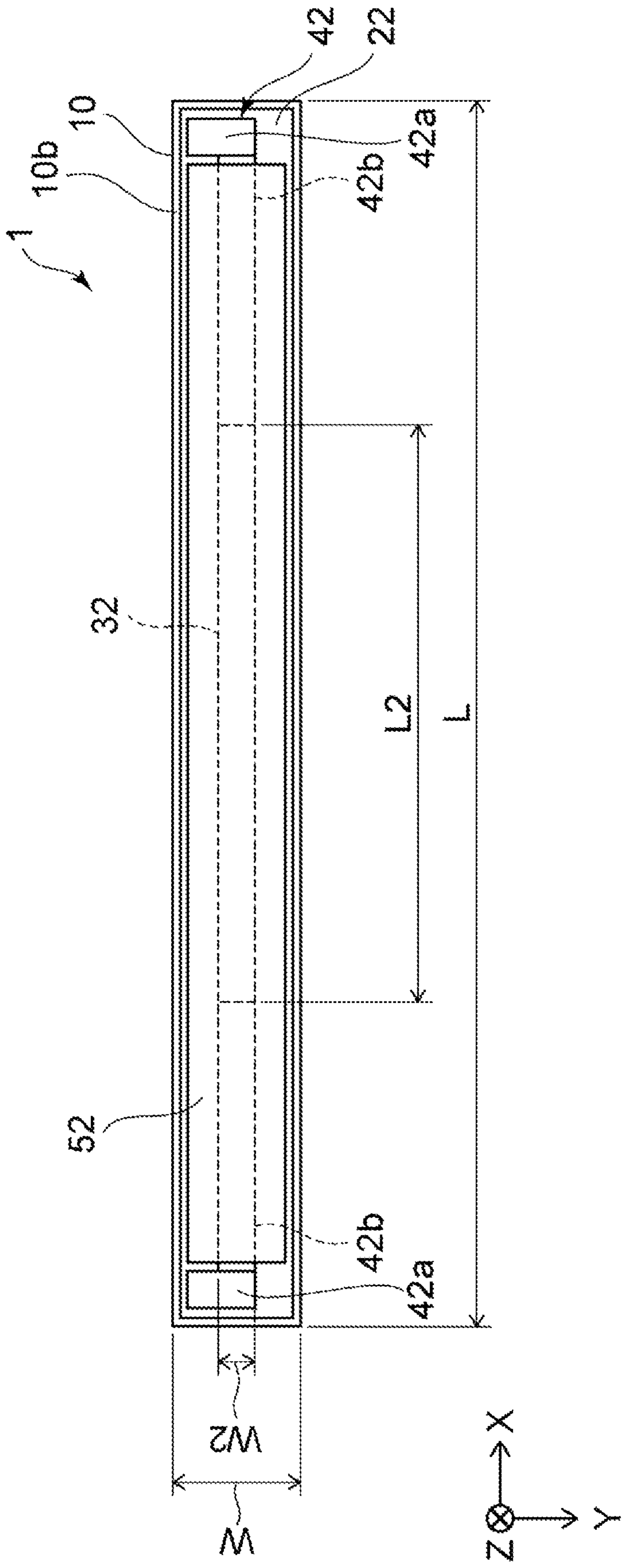
FIG. 2 is a schematic view of the heater as viewed from the other side in the Z direction.

FIG. 2 is a schematic view of the heater 1 as viewed from the other side in the Z direction.

Figure 3:
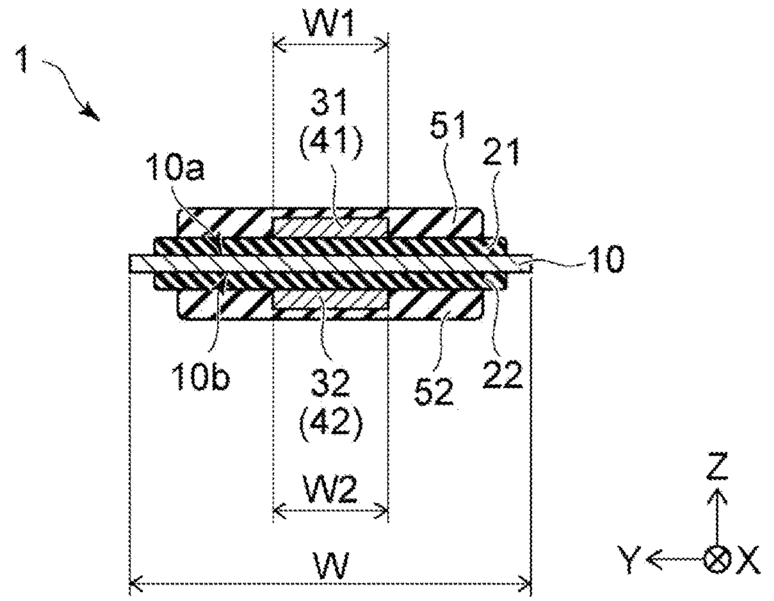
FIG. 3 is a schematic cross-sectional view of the heater in FIG. 1 in the A-A line direction.

FIG. 3 is a schematic cross-sectional view of the heater 1 in FIG. 1 in the A-A line direction.

As shown in FIGS. 1 to 3, the heater 1 includes, for example, a substrate 10, an insulating part 21 (corresponding to an example of a first insulating part), an insulating part 22 (corresponding to an example of a second insulating part), a heating element 31 (corresponding to an example of a first heating element), a heating element 32 (corresponding to an example of a second heating element), a wiring part 41, a wiring part 42, a protection part 51 (corresponding to an example of a first protection film), and a protection part 52 (corresponding to an example of a second protection film). The insulating part 21, the heating element 31, the wiring part 41, and the protection part 51 are provided on one surface 10*a* of the substrate 10 in the Z direction. The insulating part 22, the heating element 32, the wiring part 42, and the protection part 52 are provided on another surface 10*b* of the substrate 10 in the Z direction.

The substrate 10 has a plate shape and has the surface 10*a* (corresponding to an example of a first surface) and the surface 10*b* facing the surface 10*a* (corresponding to an example of a second surface). The substrate 10 has a shape extending in one direction (for example, the X direction). The planar shape of the substrate 10 is, for example, a long rectangular shape. The thickness of the substrate 10 is, for example, about 0.5 mm to 1.0 mm. The width dimension W (dimension in the lateral direction; dimension in the Y direction) of the substrate 10 is, for example, about 5 mm to 15 mm. The length L (dimension in the longitudinal direction; dimension in the X direction) of the substrate 10 may be appropriately changed depending on the size of the object to be heated (for example, paper) and the like.

The substrate 10 is made of a material having heat resistance and high thermal conductivity. Generally, the substrate 10 is formed of ceramics such as aluminum oxide, but the heater 1 according to this embodiment is provided with the substrate 10 including metal. The metal may be, for example, stainless steel, an aluminum alloy, or the like.

As shown in FIGS. 1 and 3, the insulating part 21 has an insulating property and is provided on the surface 10*a* of the substrate 10. The insulating part 21 may be provided, for example, to cover the surface 10*a* of the substrate 10. The insulating part 21 is provided to insulate between the substrate 10 including metal and the heating element 31 and the wiring part 41. Therefore, the insulating part 21 is provided between the substrate 10 and the heating element 31 and the wiring part 41. The insulating part 21 may be formed of, for example, an inorganic material such as ceramics or a glass material. The insulating part 21 may be formed by, for example, thermal spraying or firing.

The heating element 31 converts the applied electric power into heat (Joule heat). The heating element 31 is provided on the insulating part 21 (the surface of the insulating part 21 opposite to the substrate 10 side).

The heating element 31 extends, for example, along the longitudinal direction (X direction) of the substrate 10.

The heating element 31 may be formed by using, for example, ruthenium oxide ($RuO_2$), a silver-palladium (Ag—Pd) alloy, or the like. The heating element 31 may be formed by, for example, applying a paste-like material on the insulating part 21 by using a screen printing method or the like and curing the paste-like material by using a firing method or the like.

The wiring part 41 is provided, for example, on the surface of the insulating part 21 where the heating element 31 is provided. The wiring part 41 has, for example, a terminal 41*a* and a wiring 41*b*.

For example, a pair of terminals 41*a* may be provided. Each of the pair of terminals 41*a* may be provided, for example, near the ends on both sides of the substrate 10 in the X direction. The pair of terminals 41*a* are electrically connected to a power supply, a control circuit, or the like via, for example, a connector and wiring.

For example, a pair of wirings 41*b* may be provided. Each of the pair of wirings 41*b* electrically connects the terminal 41*a* and the heating element 31. One end of the wiring 41*b* is electrically connected to the terminal 41*a*. The other end of the wiring 41*b* is electrically connected to the heating element 31.

The terminal 41*a* and the wiring 41*b* are formed by using a material including, for example, silver or copper. For example, the terminal 41*a* and the wiring 41*b* may be formed by applying a paste-like material on the insulating part 21 by using a screen printing method or the like and curing the paste-like material by using a firing method or the like.

The protection part 51 is provided on, for example, the insulating part 21 and extends along the longitudinal direction (X direction) of the substrate 10. The protection part 51 covers, for example, the heating element 31 and the wiring 41*b*. In this case, the terminal 41*a* is exposed from the protection part 51.

The protection part 51 has, for example, a function of insulating the heating element 31 and the wiring 41*b*, a function of transmitting the heat generated in the heating element 31 to the outside, and a function of protecting the heating element 31 and the wiring 41*b* from external force, corrosive gas, and the like. The protection part 51 is made of a material having heat resistance and an insulating property, and having high chemical stability and thermal conductivity. The protection part 51 is formed of, for example, an inorganic material such as ceramics or a glass material. In this case, the protection part 51 may also be formed by using a glass material to which a filler including a material having high thermal conductivity such as aluminum oxide is added. The thermal conductivity of the glass material to which the filler is added may be, for example, 2 [W/(m·K)] or more.

The protection part 51 is formed by, for example, applying a paste-like material on the insulating part 21, the heating element 31, and the wiring 41*b* by using a screen printing method or the like and curing the paste-like material by using a firing method or the like.

As shown in FIGS. 2 and 3, the insulating part 22 has an insulating property and is provided on the surface 10*b* of the substrate 10. The insulating part 22 may be provided, for example, to cover the surface 10*b* of the substrate 10. The insulating part 22 is provided to insulate between the substrate 10 including metal and the heating element 32 and the wiring part 42. Therefore, the insulating part 22 is provided between the substrate 10 and the heating element 32 and the wiring part 42. The forming range, thickness, material, and forming method of the insulating part 22 may be, for example, the same as the forming range, thickness, material, and forming method of the insulating part 21 described above.

The heating element 32 converts the applied electric power into heat (Joule heat). The heating element 32 is provided on the insulating part 22 (the surface of the insulating part 22 opposite to the substrate 10 side).

The heating element 32 extends, for example, along the longitudinal direction (X direction) of the substrate 10. The heating element 32 may be formed by using, for example, ruthenium oxide (RuO2), a silver-palladium (Ag—Pd) alloy, or the like. The heating element 32 may be formed by, for example, applying a paste-like material on the insulating part 22 by using a screen printing method or the like and curing the paste-like material by using a firing method or the like.

The wiring part 42 is provided, for example, on the surface of the insulating part 22 where the heating element 32 is provided. The wiring part 42 has, for example, a terminal 42*a* and a wiring 42*b*.

For example, a pair of terminals 42*a* may be provided. Each of the pair of terminals 42*a* may be provided, for example, near the ends on both sides of the substrate 10 in the X direction. The pair of terminals 42*a* are electrically connected to a power supply, a control circuit, or the like via, for example, a connector and wiring.

For example, a pair of wirings 42*b* may be provided. Each of the pair of wirings 42*b* electrically connects the terminal 42*a* and the heating element 32. One end of the wiring 42*b* is electrically connected to the terminal 42*a*. The other end of the wiring 42*b* is electrically connected to the heating element 32.

The material and forming method of the terminal 42*a* and the wiring 42*b* may be the same as the material and forming method of the terminal 41*a* and the wiring 41*b* described above.

The protection part 52 is provided on, for example, the insulating part 22 and extends along the longitudinal direction (X direction) of the substrate 10. The protection part 52 covers, for example, the heating element 32 and the wiring 42*b*. In this case, the terminal 42*a* is exposed from the protection part 52.

The function, material, and forming method of the protection part 52 may be the same as the function, material, and forming method of the protection part 51 described above.

Further, the heater 1 may be further provided with a detection part for detecting the temperature of the heating element 31 and a detection part for detecting the temperature of the heating element 32. The detection part may be, for example, a thermistor or the like. The detection part may be provided on at least one of the side of the substrate 10 where the heating element 31 is provided and the side of the substrate 10 where the heating element 32 is provided. In this case, the protection parts 51 and 52 may cover the detection part.

Here, in recent years, it has been required to heat objects of different sizes with one heater, that is, to be versatile with respect to the size of the objects to be heated. In this case, heating elements having different lengths may be arranged side by side in the Y direction on one surface of the substrate. By doing so, it is possible to select and use heating elements having different lengths according to the size of the object to be heated. However, in this case, the dimension (width dimension) of the substrate in the Y direction becomes large, and it becomes difficult to reduce the size of the heater. Further, when the heating range is switched according to the size of the object to be heated, the temperature difference in the longitudinal direction of the long substrate becomes large. Generally, since a substrate made of ceramics is used, if the temperature difference in the longitudinal direction of the long substrate becomes large, the substrate may be cracked due to thermal stress.

Therefore, the heater 1 according to this embodiment includes the heating element 31 provided on the surface 10*a* of the substrate 10 and the heating element 32 provided on the surface 10*b* of the substrate 10. Further, as shown in FIGS. 1 and 2, the length L2 of the heating element 32 in the X direction is different from the length L1 of the heating element 31 in the X direction. For example, the length L2 may be shorter than the length L1.

For example, when the objects to be heated are A3 size paper and B5 size paper, the heating element 31 may be used for heating the A3 size paper, and the heating element 32 may be used for heating the B5 size paper. When the heating element 31 is used for heating the A3 size paper, the length L1 may be about 322 mm. When the heating element 32 is used for heating the B5 size paper, the length L2 may be about 184 mm.

Further, it is preferable that the center of the heating element 32 is at the same position as the center of the heating element 31 in the X direction. By doing so, when the heater 1 is attached to the image forming device 100, it becomes easy to make the center of the heating element 31 and the heating element 32 overlap with the center of the transport path of the object to be heated. Therefore, even when the dimensions of the object to be heated change in the direction orthogonal to the transport direction, it becomes easy to heat the object to be heated substantially uniformly.

Further, the width dimension W2, thickness, and material of the heating element 32 may be the same as the width dimension W1, thickness, and material of the heating element 31, or any of them may be different.

Although in FIGS. 1 to 3, the case where one heating element 31 is provided is shown, one or more heating elements 31 may be provided. Further, though in FIGS. 1 to 3, the case where one heating element 32 is provided is shown, one or more heating elements 32 may be provided. The number of the heating element 31 and the heating element 32 may be appropriately changed depending on the amount of heat applied to the object to be heated and the like. However, when multiple heating elements 31 are provided, the multiple heating elements 31 are provided side by side in the Y direction. When multiple heating elements 32 are provided, the multiple heating elements 32 are provided side by side in the Y direction. Therefore, the width dimension W of the substrate 10 becomes large, and it may be difficult to reduce the size of the heater 1.

Therefore, it is preferable to reduce the number of heating elements 31 by changing the resistance value of the heating element 31 according to the required amount of heat generation. For example, the number of heating elements 31 may be reduced by changing the material, width dimension W1, and thickness of the heating element 31.

Further, it is preferable to reduce the number of heating elements 32 by changing the resistance value of the heating element 32 according to the required amount of heat generation. For example, the number of heating elements 32 may be reduced by changing the material, width dimension W2, and thickness of the heating element 32.

Further, since the length of the heating element 31 and the length of the heating element 32 are different, switching between the heating element 31 and the heating element 32 changes the range in which the substrate 10 is heated. For example, when the heating element 31 is switched to the heating element 32, the range in which the substrate 10 is heated becomes smaller in the X direction. For example, when the heating element 32 is switched to the heating element 31, the range in which the substrate 10 is heated becomes larger in the X direction. When the range in which the substrate 10 is heated changes, it is conceivable that the substrate 10 may be deformed or damaged due to thermal stress. However, the surface 10*a* of the substrate 10 is provided with the insulating part 21, the wiring part 41, and the protection part 51. The surface 10*b* of the substrate 10 is provided with the insulating part 22, the wiring part 42, and the protection part 52. Therefore, for example, the thermal stress generated on the side of the surface 10*a* of the substrate 10 may be offset by the thermal stress generated on the side of the surface 10*b* of the substrate 10. As a result, it is possible to prevent the substrate 10 from being deformed or damaged.

Further, as described above, the substrate 10 is made of metal. Therefore, the rigidity and toughness of the substrate 10 may be increased. If the rigidity and toughness of the substrate 10 may be increased, it is possible to prevent the substrate 10 from being deformed or damaged even if thermal stress is generated by switching between the heating element 31 and the heating element 32.

As described above, if the heater 1 according to this embodiment is used, the heating range may be switched according to the size of the object to be heated, and the size may be reduced and the substrate 10 may be suppressed from being damaged.

(Image Forming Device)

Next, an example of an image forming device 100 according to this embodiment will be described.

In the following, as an example, a case where the image forming device 100 is a copying machine will be described. However, the image forming device 100 is not limited to the copying machine, and may be any one provided with a heater for fixing the toner. For example, the image forming device 100 may be a printer or the like. Further, it may be a rewritable card reader/writer or the like.

Figure 4:
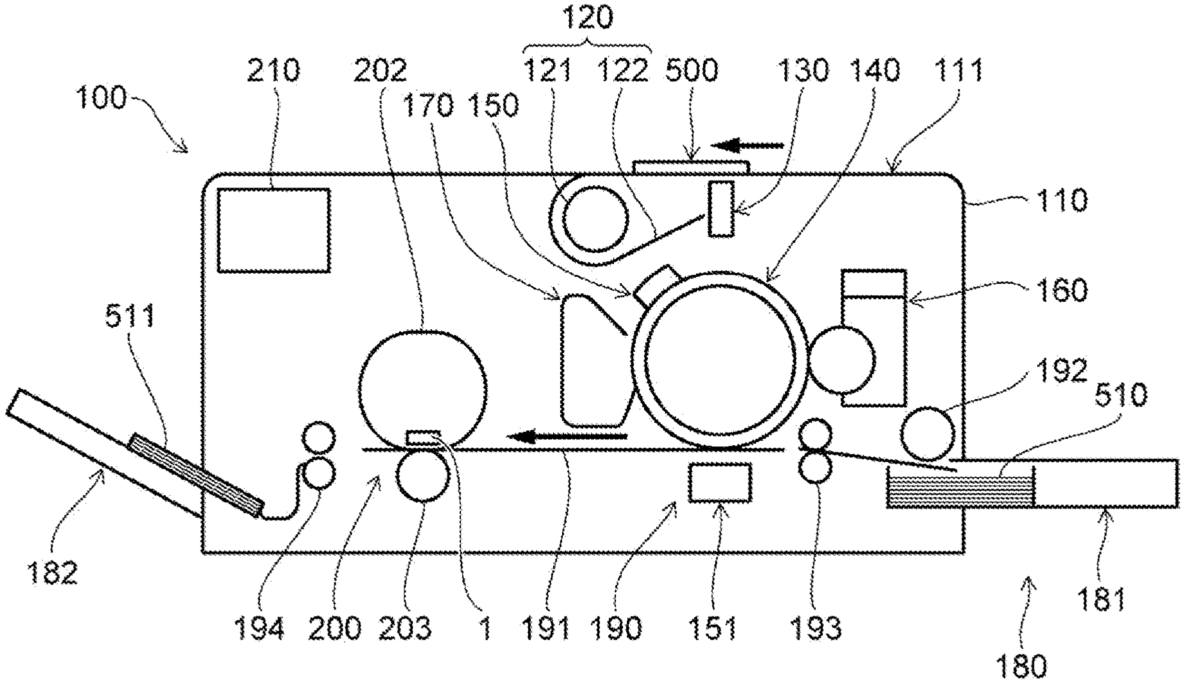
FIG. 4 is a schematic view for illustrating an image forming device according to the embodiment.

FIG. 4 is a schematic view for illustrating the image forming device 100 according to this embodiment.

Figure 5:
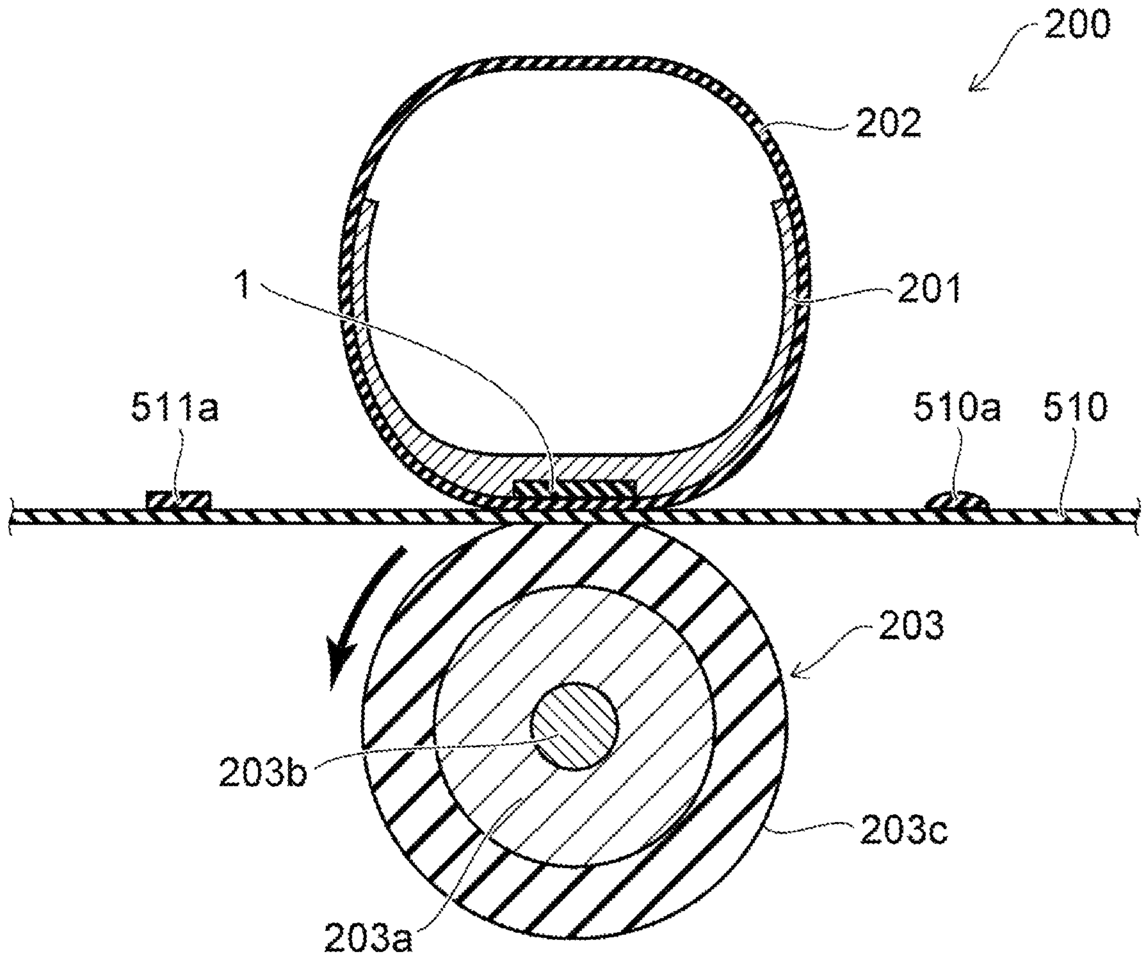
FIG. 5 is a schematic view for illustrating a fixing part.

FIG. 5 is a schematic view for illustrating a fixing part 200.

As shown in FIG. 4, the image forming device 100 includes, for example, a frame 110, an illumination part 120, an imaging element 130, a photosensitive drum 140, a charging part 150, a discharge part 151, a developing part 160, a cleaner 170, a housing part 180, a transport part 190, the fixing part 200, and a controller 210.

The frame 110 has a box shape, and the frame 110 houses therein the illumination part 120, the imaging element 130, the photosensitive drum 140, the charging part 150, the developing part 160, the cleaner 170, a part of the housing part 180, the transport part 190, the fixing part 200, and the controller 210.

A window 111 made of a translucent material such as glass may be provided on the upper surface of the frame 110. An original 500 to be copied is placed on the window 111. Further, a moving part for moving the position of the original 500 may be provided.

The illumination part 120 is provided in the vicinity of the window 111. The illumination part 120 has, for example, a light source 121 such as a lamp and a reflector 122.

The imaging element 130 is provided in the vicinity of the window 111.

The photosensitive drum 140 is provided below the illumination part 120 and the imaging element 130. The photosensitive drum 140 is rotatably provided. For example, a zinc oxide photosensitive layer or an organic semiconductor photosensitive layer is provided on the surface of the photosensitive drum 140.

The charging part 150, the discharging part 151, the developing part 160, and the cleaner 170 are provided around the photosensitive drum 140.

The housing part 180 has, for example, a cassette 181 and a tray 182. The cassette 181 is detachably attached to one side of the frame 110. The tray 182 is provided on the side of the frame 110 opposite to the side to which the cassette 181 is attached. Paper 510 (for example, blank paper) before copying is stored in the cassette 181. Paper 511 on which a copy image **511*a* is fixed is stored in the tray 182**.

The transport part 190 is provided below the photosensitive drum 140. The transport part 190 transports the paper 510 between the cassette 181 and the tray 182. The transport part 190 has, for example, a guide 191 that supports the paper 510 to be transported, and transport rollers 192 to 194 that transport the paper 510. Further, the transport part 190 may be provided with a motor for rotating the transport rollers 192 to 194.

The fixing part 200 is provided on the downstream side (tray 182 side) of the photosensitive drum 140.

As shown in FIG. 5, the fixing part 200 has, for example, the heater 1, a stay 201, a film belt 202, and a pressure roller 203.

The heater 1 is attached to the transport line side of the paper 510 of the stay 201. The heater 1 may be embedded in the stay 201. For example, the side of the heater 1 provided with the protection part 51 may be exposed from the stay 201.

The film belt 202 covers the stay 201 provided with the heater 1. The film belt 202 may be formed of, for example, a heat-resistant resin such as polyimide.

The pressure roller 203 is provided to face the stay 201. The pressure roller 203 has, for example, a core metal **203*a*, a drive shaft 203*b*, and an elastic part 203*c*. The drive shaft 203*b* protrudes from the end of the core metal 203*a* and is connected to a drive device such as a motor. The elastic part 203*c* is provided on the outer surface of the core metal 203*a*. The elastic part 203*c* is formed of an elastic material having heat resistance. The elastic part 203*c*** may be formed of, for example, a silicone resin or the like.

The controller 210 is provided inside the frame 110. The controller 210 has, for example, a calculation part such as a central processing unit (CPU) and a storage part in which a control program is stored. The calculation part controls the operation of each element provided in the image forming device 100 based on the control program stored in the storage part. Further, the controller 210 may also include an operation part for a user to input copying conditions and the like, a display part for displaying an operating state or an abnormality display, and the like.

Since known techniques may be applied to the control of each element provided in the image forming device 100, detailed description thereof will be omitted.

Although some embodiments of the disclosure have been described above, these embodiments are presented as examples and are not intended to limit the scope of the disclosure. The novel embodiments may be implemented in various other forms, and various omissions, replacements, changes, and the like may be made without departing from the gist of the disclosure. The embodiments and variations thereof are included in the scope and gist of the disclosure, and are also included in the scope of the disclosure described in the claims and the equivalent scope thereof. In addition, each of the above-described embodiments may be implemented in combination with each other.

What is claimed is:

1. A heater comprising:

a substrate comprising metal and having a shape extending in one direction;

a first insulating part provided on a first surface of the substrate and having an insulating property;

only one heating element provided on the first insulating part and extending along a longitudinal direction of the substrate, wherein the only one heating element provided on the first insulating part is one continuous piece;

a first protection part provided on the first insulating part, extending along the longitudinal direction of the substrate and covering the only one heating element provided on the first insulating part;

a second insulating part provided on a second surface of the substrate opposite the first surface and having an insulating property;

only one heating element provided on the second insulating part and extending along the longitudinal direction of the substrate, wherein the only one heating element provided on the second insulating part is one continuous piece; and a second protection part provided on the second insulating part, extending along the longitudinal direction of the substrate and covering the only one heating element provided on the second insulating part;

wherein a length of the only one heating element provided on the second insulating part is different from a length of the only one heating element provided on the first insulating part in the longitudinal direction of the substrate.

2. The heater according to claim 1, wherein a center of the only one heating element provided on the second insulating part is located at a same position as a center of the only one heating element provided on the first insulating part in the longitudinal direction of the substrate.

3. An image forming device comprising the heater according to claim 1.

4. The image forming device according to claim 3, wherein a center of the only one heating element provided on the second insulating part is located at a same position as a center of the only one heating element provided on the first insulating part in the longitudinal direction of the substrate.

* * * * *